US012163821B2

(12) United States Patent
Piech et al.

(10) Patent No.: US 12,163,821 B2
(45) Date of Patent: *Dec. 10, 2024

(54) SUPPRESSION TANK SCALE AND LEVEL DETERMINATION

(71) Applicant: KIDDE-FENWAL, LLC, Ashland, MA (US)

(72) Inventors: Marcin Piech, East Hampton, CT (US); Tadeusz Pawel Witczak, Farmington, CT (US); Beata I. Wawrzyniak, South Windsor, CT (US)

(73) Assignee: KIDDE-FENWAL, LLC, Ashland, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/139,489

(22) Filed: Apr. 26, 2023

(65) Prior Publication Data

US 2023/0266157 A1  Aug. 24, 2023

Related U.S. Application Data

(62) Division of application No. 17/254,419, filed as application No. PCT/US2019/053776 on Sep. 30, 2019, now Pat. No. 11,668,596.

(Continued)

(51) Int. Cl.
*G01F 23/284* (2006.01)
*A62C 13/62* (2006.01)
(Continued)

(52) U.S. Cl.
CPC ............ *G01F 23/284* (2013.01); *A62C 13/62* (2013.01); *A62C 37/50* (2013.01); *G01F 23/20* (2013.01); *G01G 17/04* (2013.01)

(58) Field of Classification Search
CPC ....... G01F 23/284; G01F 23/20; A62C 13/62; A62C 37/50; G01G 17/04
See application file for complete search history.

(56) References Cited

U.S. PATENT DOCUMENTS 3,195,663 A   7/1965 Thompson
3,494,436 A   2/1970 Lanning
(Continued)

FOREIGN PATENT DOCUMENTS

CN   202083448 U   12/2011
CN   103354759 A   10/2013
(Continued)

OTHER PUBLICATIONS

"Continuous Gas Weight Monitoring System", Dec. 2009, Fireguard Safety Equipment Co., Ltd., London, United Kingdom.
(Continued)

*Primary Examiner* — David Z Huang
(74) *Attorney, Agent, or Firm* — Honigman LLP

(57) ABSTRACT

In a system for measuring a fire suppressant or fire suppression propellant quantity, the system comprising: a base (102); a top plate (106) positioned to support a tank (22) of said fire suppressant or fire suppression propellant; a plurality of springs (112) positioned between the top plate and the base to support the top plate atop the base, the plurality of springs positioned to support the top plate along a range of motion between an extended condition and a retracted condition; a first magnetic member (142) mounted to the base; a second magnetic member (140) mounted to the top plate so that a spacing between the first magnetic member and the second magnetic member decreases as the top plate moves from the extended condition to the retracted condition. At least one of the first magnetic member and the second magnetic member is a permanent magnet. A mag- (Continued)

netic field sensor (160) is positioned to detect changes in a magnetic field associated with changes in said spacing.

20 Claims, 6 Drawing Sheets

Related U.S. Application Data

(60) Provisional application No. 62/773,350, filed on Nov. 30, 2018.

(51) Int. Cl.
*A62C 37/50* (2006.01)
*G01F 23/20* (2006.01)
*G01G 17/04* (2006.01)

(56) References Cited

U.S. PATENT DOCUMENTS

| | | |
|---|---|---|
| 4,336,854 A | 6/1982 | Jensen |
| 4,420,055 A | 12/1983 | Grutzediek et al. |
| 4,667,514 A | 5/1987 | Baer |
| 4,802,541 A | 2/1989 | Bator et al. |
| 6,284,987 B1 | 9/2001 | Al-Modiny |
| 6,504,481 B2 | 1/2003 | Teller |
| 7,188,679 B2 | 3/2007 | McSheffrey et al. |
| 9,168,407 B2 | 10/2015 | Kho et al. |
| 9,221,667 B2 | 12/2015 | Hershberger et al. |
| 9,453,611 B2 | 9/2016 | Suman |
| 11,668,596 B2 * | 6/2023 | Piech ............... A62C 13/62 73/290 R |
| 2004/0164868 A1 | 8/2004 | Thomas |
| 2006/0118343 A1 | 6/2006 | Satoh et al. |
| 2006/0266111 A1 * | 11/2006 | Gourlay ............ G01F 23/18 73/299 |
| 2011/0029262 A1 | 2/2011 | Barkhouse |
| 2014/0113039 A1 | 4/2014 | Barkhouse |
| 2014/0311239 A1 | 10/2014 | Marjanovic et al. |
| 2015/0068301 A1 | 3/2015 | Ross, Jr. et al. |
| 2015/0306438 A1 | 10/2015 | Huelsen et al. |
| 2016/0370221 A1 * | 12/2016 | Schrag ............... G01G 7/02 |

FOREIGN PATENT DOCUMENTS

| | | |
|---|---|---|
| CN | 204563401 U | 8/2015 |
| CN | 106267659 A | 1/2017 |
| DE | 102012101081 A1 | 8/2013 |
| EP | 1271113 A1 | 1/2003 |
| EP | 2335422 B1 | 6/2011 |
| EP | 3121567 A1 | 1/2017 |
| FR | 2826114 A3 | 12/2002 |
| KR | 20070000745 A | 1/2007 |
| WO | 03/034003 A1 | 4/2003 |
| WO | 03/104755 A1 | 12/2003 |

OTHER PUBLICATIONS

"CO2 Discharge Nozzle, Gas Weight Monitoring System", May 2014, pp. 8-10, NAFFCO, Dubai, United Arab Emirates.
"TLE4966-3K High Sensitivity Automotive Hall Switch with direction detection", Datasheet, Sep. 20, 2010, Infineon Technologies AG, Neubiberg, Germany.
"Low Power 3D Magnetic Sensor with I2C Interface, TLV493D-A1B6, 3D Magnetic Sensor," Datasheet, Jan. 29, 2016, Infineon Technologies AG, Neubiberg, Germany.
Mark L. Robin et al., "Fire Suppression Testing: Extinguishment of Class A Fires with Clean Agents", Proceedings of the Halon Options Technical Working Conference, Apr. 24, 2001, pp. 265-271, Albuquerque, New Mexico.
International Search Report and Written Opinion dated Dec. 19, 2019 for PCT/US2019/053776.
Chinese Office Action dated Dec. 22, 2023 for Chinese Patent Application No. 201980041016.8.
Extended European Search Report dated Feb. 21, 2024 for European Patent Application No. 23211009.8.

* cited by examiner

SUPPRESSION TANK SCALE AND LEVEL DETERMINATION

CROSS-REFERENCE TO RELATED APPLICATION

This is a divisional of U.S. patent application Ser. No. 17/254,419, filed Dec. 21, 2020, and entitled "Suppression Tank Scale and Level Determination", which is a 371 US national stage application of PCT/US19/53776, filed Sep. 30, 2019, which claims benefit of U.S. Patent Application No. 62/773,350, filed Nov. 30, 2018, and entitled "Suppression Tank Scale and Level Determination", the disclosures of which are incorporated by reference herein in their entireties as if set forth at length.

BACKGROUND

The disclosure relates to fire suppression. More particularly, the disclosure relates to level sensing in systems using inert gas and liquid agents.

Liquid fire suppression agents have been used for decades. Although some agents such as hydrofluorocarbon (HFC) (e.g. Halon 1301 (bromotrifluoromethane) and HFC-227ea (heptafluoropropane)) are in disfavor due to environmental concerns, replacements are readily commercially available, such as a fluoroketone formulated as dodecafluoro-2-methylpentan-3-one (1,1,1,2,2,4,5,5,5-nonafluoro-4-(trifluoromethyl)-3-pentanone) ($CF_3CF_2C(O)CF(CF_3)_2$) (ASHRAE nomenclature FK-5-1-12). Such agents are typically used with a pressurant/propellant such as nitrogen ($N_2$). Kidde-Fenwal, Inc. of Ashland, Massachusetts manufactures an exemplary fire suppression system, the Kidde® ADS™. Other suppressant agents and pressurants/propellants may be used in fire suppression systems as necessary to meet desired fire suppression capabilities.

Typically such agents are stored as a liquid in one or more metal tanks (e.g., steel tanks having a cylindrical centerbody and domed ends although other shapes and materials are also known in the art). A tank is typically positioned with its axis vertical so that one end is an upper end or top and the other a lower end or base. The upper end typically has a number of ports with fittings (e.g., threaded fittings). Typically a large center port receives a discharge assembly. The discharge assembly may include a fitting portion mated to the tank fitting and an external valve (e.g., automatically controllable via a control system). A discharge conduit (also known as a siphon tube or dip tube) extends downward into the tank and typically has an open lower end near the bottom of the tank. In facility configurations requiring multiple tanks, the tanks may be connected to a suppression system serially, independently, or in distributed locations in different configurations, and may be collocated or distributed throughout a facility.

Due to their low heat of evaporation and high vapor pressure (e.g., relative to water), typical liquid fire suppression agents will rapidly vaporize at discharge from the nozzle outlets and thus be delivered as vapor.

If the discharge valve is opened, pressure in the tank headspace (e.g., from the pressurant/propellant noted above) is sufficient to drive liquid suppressant up through the discharge conduit and out of the tank. Pre-use, the surface level of liquid in the tank will typically be well into the upper half of the tank. The exact position will depend on factors including the nature of the suppressant, the nature of the pressurant/propellant (e.g. composition and whether internally or externally located), and the application.

It is necessary to at least occasionally measure the quantity of a suppression agent in the tank (e.g., safety regulations typically require semi-annual inspection including verification of agent amount). To do this without venting the tank, the tanks may be weighed. Alternatively, several liquid level measurement systems have been proposed. A number of these systems make use of an additional vertically-extending conduit mounted to an additional port in the tank upper end. Typically, the tanks may be provided with multiple smaller off-center ports (e.g., with internally-threaded fittings) in addition to the center port. These ports may serve for various functions. An exemplary such liquid level sensing system has a fitting mounted to one of those additional port fittings with a conduit (e.g., metal tube) extending vertically down toward the base of the tank. Unlike the discharge conduit, the lower end of this liquid level sensing tube is closed so that the interior of the liquid level sensing tube is sealed relative to the surrounding interior of the tank. A float may surround the liquid level sensing tube. The float may be magnetized. The float may magnetically interact with a member movable within the tube to in turn provide indication of the liquid level.

In one basic example of such a liquid level sensing system, the liquid level sensing fitting, in turn, has a removable cap or plug providing access to the upper end of the tube. A magnetic weight at the end of a measuring tape, string, or other device, may be located in the tube. The magnetic weight will interact with the float to be held at the same level as the float and thus at the level of the surface of liquid in the tank. This allows the level of the surface of liquid in the tank to be measured relative to the liquid level sensing fitting and thus relative to any other reference on the tank. Such measurements are typically taken periodically manually by a person assigned to the task. In one example where the weight and measuring tape are already in the tube, the end of the tape opposite the weight may be connected to the removable cap or plug. The user may open the cap or plug and pull to take up slack in the measuring tape. The user may take a reading with the tape to determine the liquid level of the tank.

Yet more complex systems are automated with the magnetic weight permanently within the tube and its vertical position electronically measured. Yet other systems involve capacitive measurements between inner and outer tubes. However, such systems are often costly, inaccurate, subject to separate maintenance, or require some manual measurement and are thus time-consuming and prone to human error.

Inert gas systems such as carbon dioxide ($CO_2$) are not amenable to float-type sensors. Inert gas tanks may be individually weighed on a portable scale. This is both a time consuming and hazardous operation. Moreover, during the weighing procedure, the suppression system is taken off-line and does not offer asset protection. An exemplary inert agent is stored in a seamless metal cylinder having a single central fitting. The discharge valve may be externally threaded to engage an internal thread of the fitting. The fitting however also has an external thread normally used for a protective cap. However, for an alternative weighing system to a portable scale, a collar may instead be attached to that external thread to suspend the tank for a support structure via a strain gauge scale. The scale measures the tank weight.

SUMMARY

One aspect of the disclosure involves a system for measuring a fire suppressant or fire suppression propellant quantity. The system has: a base; a top plate positioned to support a tank of said fire suppressant or fire suppression propellant; and a plurality of springs positioned between the top plate and the base to support the top plate atop the base. The plurality of springs are positioned to support the top plate along a range of motion between an extended condition and a retracted condition. A first magnetic member is mounted to the base. A second magnetic member is mounted to the top plate so that a spacing between the first magnetic member and the second magnetic member decreases as the top plate moves from the extended condition to the retracted condition. At least one of the first magnetic member and the second magnetic member is a permanent magnet. A magnetic field sensor is positioned to detect changes in a magnetic field associated with changes in said spacing.

In one or more embodiments of any of the foregoing embodiments, the first magnetic member and the second magnetic member are permanent magnets.

In one or more embodiments of any of the foregoing embodiments, the first magnetic member and the second magnetic member have opposed polarity.

In one or more embodiments of any of the foregoing embodiments, the magnetic field sensor is a 3D magnetic field sensor.

In one or more embodiments of any of the foregoing embodiments, the 3D magnetic field sensor is an IC sensor.

In one or more embodiments of any of the foregoing embodiments, the magnetic field sensor is a Hall effect sensor.

In one or more embodiments of any of the foregoing embodiments, the first magnetic member and the second magnetic member are centrally located.

In one or more embodiments of any of the foregoing embodiments, the plurality of springs is a plurality of coil springs.

In one or more embodiments of any of the foregoing embodiments, the system further comprises control electronics having memory storing at least one of a database and a function relating sensor output to mass.

In one or more embodiments of any of the foregoing embodiments, the system is in combination with a suppressant tank atop the top plate.

In one or more embodiments of any of the foregoing embodiments, the combination further comprises said fire suppressant in the tank.

In one or more embodiments of any of the foregoing embodiments, said fire suppressant is a clean agent.

In one or more embodiments of any of the foregoing embodiments, said fire suppressant is carbon dioxide.

In one or more embodiments of any of the foregoing embodiments, a method for using the system comprises: with the magnetic field sensor, detecting the changes in the magnetic field; and, based upon the detected changes, calculating said quantity of said suppressant in the tank.

In one or more embodiments of any of the foregoing embodiments, the calculating is performed via control electronics.

In one or more embodiments of any of the foregoing embodiments, the calculating comprises using a look-up table with data for a combination of tank mass and tank position on the scale.

In one or more embodiments of any of the foregoing embodiments, the method further comprises initializing the control electronics.

In one or more embodiments of any of the foregoing embodiments, the initializing the control electronics comprises populating a look-up table with data for a combination of tank mass and tank position on the scale.

In one or more embodiments of any of the foregoing embodiments, the magnetic field sensor is a 3D magnetic field sensor providing a digital output to the control electronics.

Another aspect of the disclosure involves a fire suppression system comprising: a tank having a first port and an interior; at least one of a fire suppressant and a fire suppression propellant in the interior; a discharge assembly mounted to the first port and comprising a discharge valve; a base; one or more springs positioned to support the tank atop the base along a range of motion between a relatively relaxed condition and a relatively compressed condition; a first magnetic member mounted to the base; a second magnetic member mounted to the tank so that a spacing between the first magnetic member and the second magnetic member decreases as the tank moves when the one or more springs go from the relatively relaxed condition to the relatively compressed condition. At least one of the first magnetic member and the second magnetic member is a permanent magnet. A magnetic field sensor is positioned to detect changes in a magnetic field associated with changes in said spacing.

Another aspect of the disclosure involves a method for measuring a fire suppressant or fire suppression propellant quantity. The method comprises: with a tank of the fire suppressant or fire suppression propellant supported by one or more springs, the one or more springs positioned to support the tank along a range of motion between a relatively relaxed condition and a relatively compressed condition, measuring a magnetic field that varies with position along the range of motion; and converting the measurement of the magnetic field into a measurement of said quantity.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
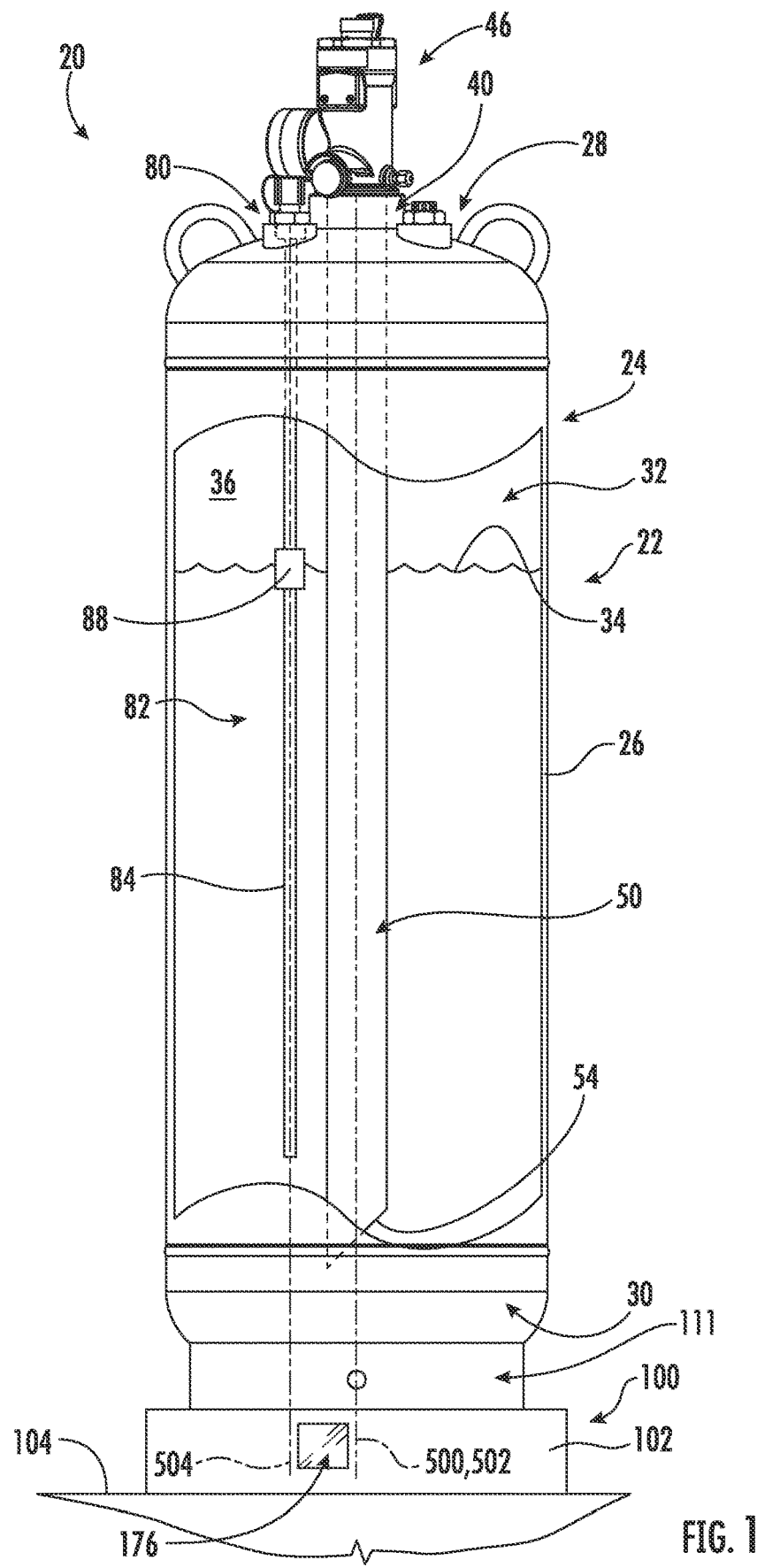
FIG. 1 is a partially cutaway view of a fire suppressant storage device atop a tank scale.

FIG. 1 shows a fire suppression storage device 20 including a tank 22. The exemplary tank 22 has a body 24 including a cylindrical centerbody section 26 defining a central longitudinal axis 500. In an exemplary installation situation, the axis 500 is vertical. The tank 22 has respective upper and lower domed end portions 28 and 30. Exemplary tank materials are metal (e.g., steel or aluminum alloy) and the tank 22 may represent any of numerous existing or yet-developed tank configurations. The tank 22 has an interior 32 which, in pre-discharge condition, contains a body of liquid suppressant (agent) shown having a surface 34 leaving a headspace 36 thereabove to contain compressed gas pressurant/propellant. The upper end portion 28 bears a center port surrounded by a fitting 40 (e.g., internally-threaded or externally-threaded) defining a port. The exemplary fitting 40 (FIG. 2) receives a lower externally threaded portion 42 (FIG. 2) of a body 44 of a discharge valve assembly 46 having a discharge valve 48. The discharge valve assembly 46 combines with a discharge conduit (e.g., a metal tube) 50 to form a discharge assembly.

Exemplary suppressants are HFCs or non HFC agents such as FK-5-1-12 mentioned above. Suppressants may broadly include "clean agents" and aqueous agents. A "clean agent" is defined as an "electrically nonconductive, volatile, or gaseous fire extinguishant that does not leave a residue upon evaporation." National Fire Protection Association (NFPA) Standard for Clean Agent Fire Extinguishing Systems—NFPA 2001.

Further "clean agents" include halocarbons (haloalkanes, haloketones, haloacids and the like) and their blends. Specific examples include fluoroform (HFC-23), bromotrifluoromethane (Freon 13B1), trifluoroiodomethane (Freon 13T1), pentafluoroethane (HFC-125), 1,1,1,2,3,3,3-heptafluoropropane (HFC-227ea), and the like. Exemplary pressurant/propellant is $N_2$, argon (Ar), carbon dioxide ($CO_2$), or blends.

Figure 2:
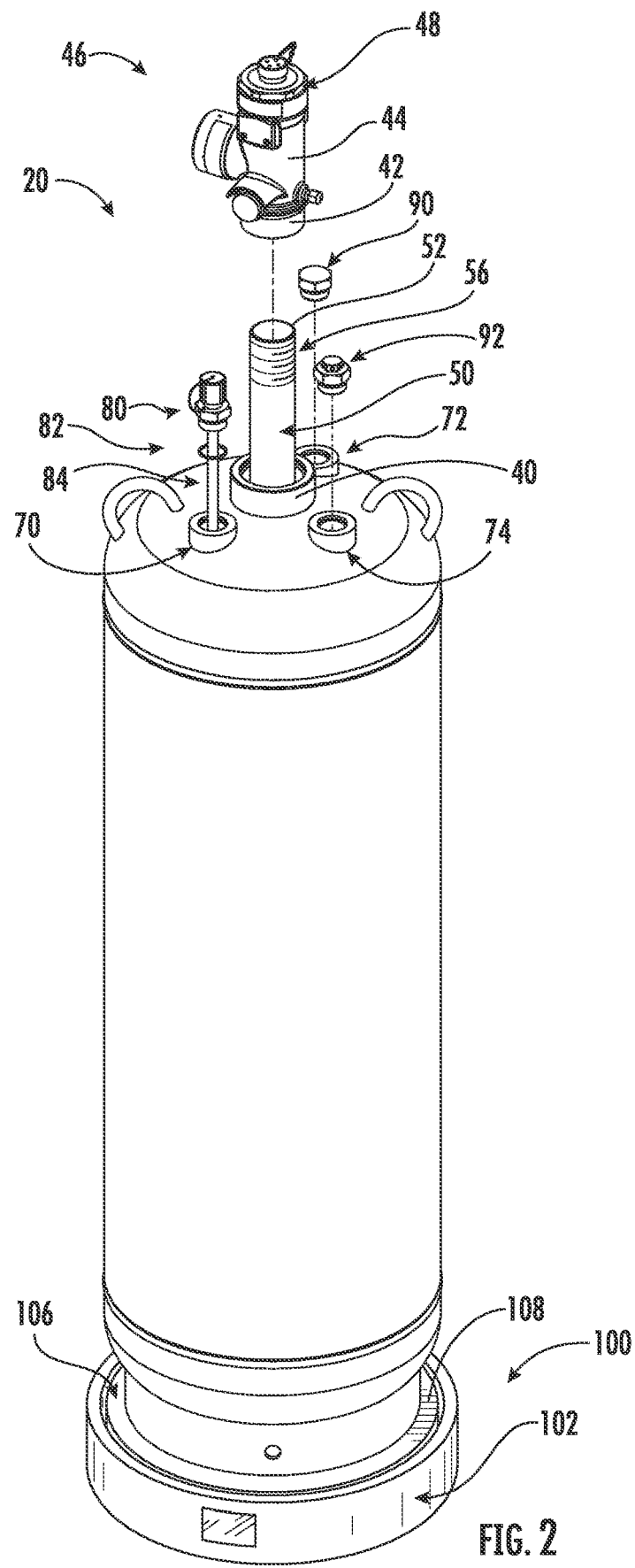
FIG. 2 is a partially exploded view of the device of FIG. 1.

As shown in FIG. 2, the exemplary discharge conduit 50 extends from an upper end 52 (FIG. 2) to a lower end 54 (FIG. 1). An exemplary portion 56 (FIG. 2) adjacent the upper end 52 is externally threaded and received in an internally threaded bore of the discharge valve body lower portion 42. In operation, the lower end 54 (FIG. 1) is well below the liquid surface 34 (FIG. 1) so that pressure in the headspace 36 (FIG. 1) will drive suppressant upward through the discharge tube if the discharge valve is open. In the exemplary installed condition, the discharge conduit axis 502 is coincident with the tank axis 500.

As so far described, the fire suppressant storage device is representative of one exemplary configuration of many existing or yet-developed configurations to which the following teachings may apply.

FIG. 2 shows three off-axis ports 70, 72, and 74. All are internally-threaded. In an exemplary implementation of a retrofit from a baseline system, a top access plug 80 (FIG. 2) of the baseline liquid level sensing or measuring assembly 82 is mounted to the port 70.

FIG. 2 also shows respective plugs 90 and 92 with the ports 72 and 74. These might respectively be re-fill ports, overpressure devices such as rupture disks or relief valves, auxiliary pressure gauges, and the like. In alternative situations where an external pressurant/propellant is used (e.g., an external $N_2$ "driver" tank), one of the ports may couple to the driver tank or the driver tank may couple to the valve assembly.

As is discussed below, an exemplary implementation is discussed in the context of a retrofit of a baseline suppression system suppressant tank already containing suppressant and already having a liquid level measuring tube and associated magnetic float.

FIG. 1 shows the baseline liquid level measurement assembly as including a tube 84 depending from a lower end of the access plug 80. The exemplary access plug body and tube 84 are metallic (e.g., stainless steel). The exemplary tube 84 extends along a central longitudinal axis 504 shared with the plug 80 and the port 70 (when assembled/installed) from an open upper end to a closed lower end.

The system includes a baseline float-type liquid level measuring assembly 82 (with magnetic float 88 for interacting with a member (not shown) within the tube 84). In the exemplary retrofit, this measuring assembly 82 may be left in place but not used. In an original equipment manufacture (OEM) situation of a redesign, the assembly 82 may be omitted and the associated port 70 on the tank plugged/sealed or equipped with some other device for some other function.

The exemplary newly-designed, redesigned, retrofitted, or otherwise revised system has a means for determining agent quantity comprising a scale 100 (FIG. 1) used to weigh the tank 22 and its contents. By subtracting weight of an empty tank or an expended tank (potentially having some residual amount of liquid in it) from a measured weight, a quantity of suppressant may be determined. A similar scale 100 and process may be used to weigh a pressurant in a remote driver situation. Thus, in the remote driver situation, each suppressant tank and each pressurant tank may stand atop a respective associated scale 100.

The exemplary scale 100 comprises a base 102 for supporting the scale 100 and tank 22 atop a support surface 104 such as a floor of a building or a rack structure. The exemplary scale 100 further includes a top plate 106 (FIGS. 2-5) above the base and having an upper surface 108 (FIG. 2) for contacting and supporting the bottom 110 (FIG. 4) of a base 111 of the tank. To support the top plate 106, one or more springs 112 extend between the top plate 106 and a bottom plate 122 of the scale base 102. The exemplary springs 112 may be compression springs (e.g., metal coil springs) having an upper end 114 along an underside 116 of the top plate 106 and a lower end 118 on an upper surface 120 of the bottom plate 122 of the scale base 102. The springs may be secured in place to one or both of the base and top plate via clips (not shown) or via projections or other seats.

The exemplary scale base 102 and top plate 106 are circular in planform/footprint. The exemplary base 102 comprises the combination of the base plate or bottom plate 122 and a sidewall 124 extending up from a periphery of the bottom plate 122 to an upper rim 126. The sidewall 124 has an inner diameter (ID) surface and an outer diameter (OD) surface. The top plate 106 has a cylindrical peripheral/OD surface spaced apart from the sidewall 124 ID surface. The base upper surface 120 is an upper surface of the bottom plate 122. An exemplary base and top plate are formed of metal (e.g. machined aluminum alloy or steel).

The exemplary configuration of the scale 100 has a central vertical/longitudinal axis 506 which, in the exemplary embodiment is targeted to be coincident with the tank axis 500. However, unlike the high degree of alignment between the tank axis 500 and dip tube axis 502, there may be more significant departures between the scale axis 506 and the tank axis 500. For example, the scale 100 and the tank 22 may lack precise registry features (e.g., lacking a seat on the top plate upper surface 108 interfitting with the bottom 110 of the tank base 111). Thus, the axes 500, 506 may become spaced-apart. This may be in an initial condition on placement of the tank 22 or random vibration or other external force may cause a departure from coincidence. Departure from coincidence may further include tilting or tipping (e.g., if the tank 22 somehow leans against a wall or the like).

Figure 3:
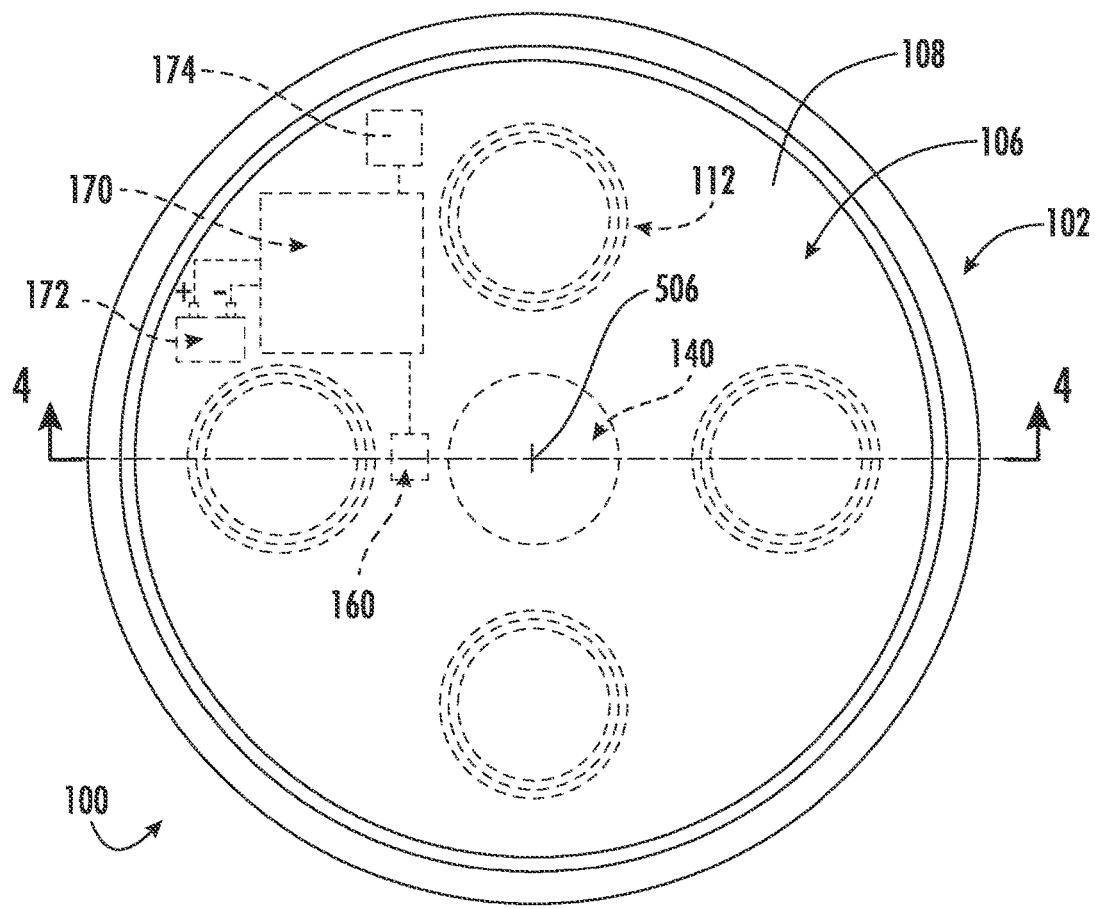
FIG. 3 is a schematic top view of the tank scale showing hidden features in broken lines.

The exemplary configuration places the springs 112 evenly-spaced in a regular circumferential array about the axis. The illustrated example has four such springs (FIG. 3). In such configurations, typically at least three springs would be needed.

Figure 4:
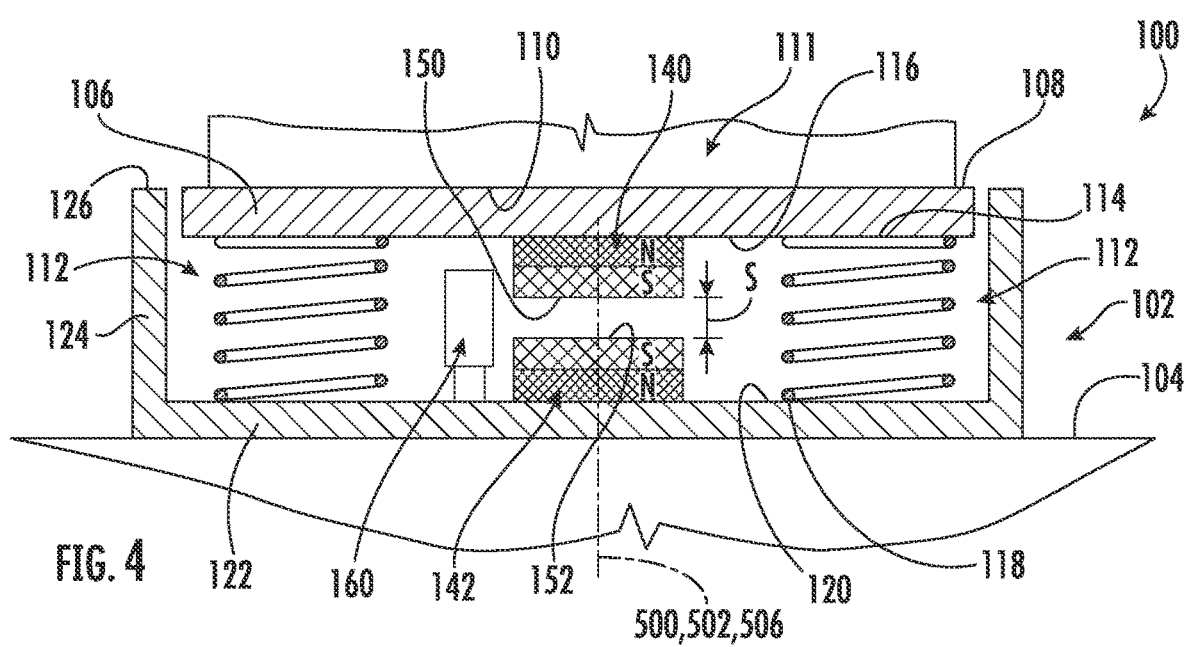
FIG. 4 is a schematic central vertical sectional view of the tank scale, taken along line 4-4 in FIG. 3.
Figure 5:
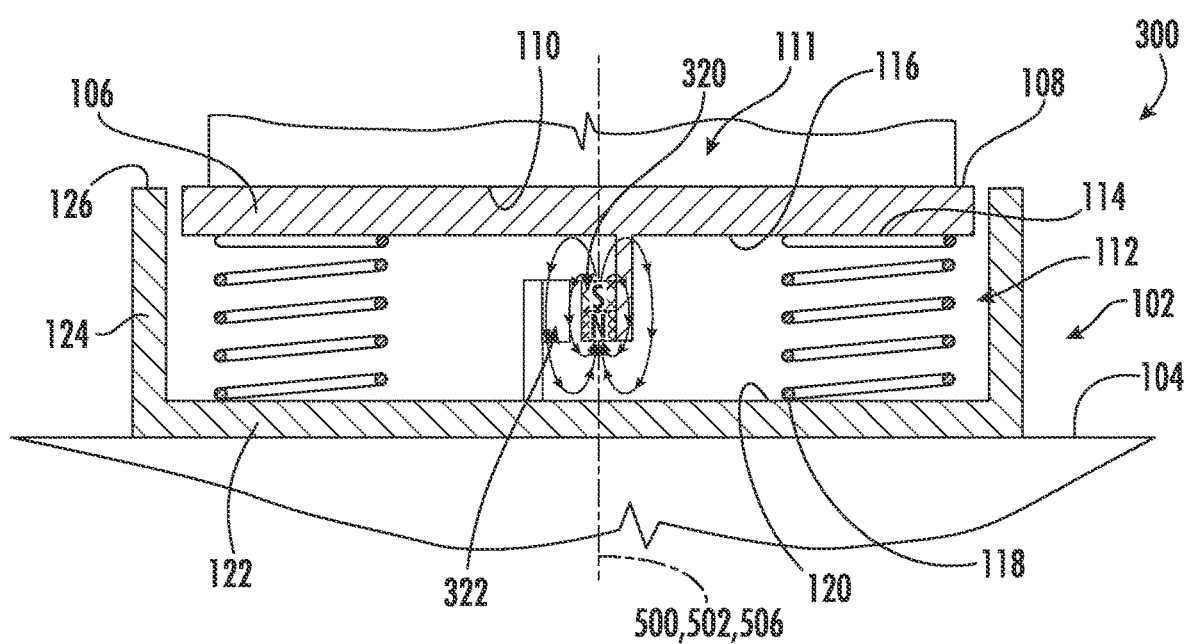
FIG. 5 is a schematic partial central vertical sectional view of an alternate tank scale.

The weight of the tank atop the top plate will compress the springs and draw the top plate closer to the base plate. Thus, in view of the spring constant, the separation between top plate and base plate at one or more locations may be used to determine the weight of the tank. To determine the weight of the tank, the separation may be determined via a magnetic mechanism. An exemplary mechanism involves the interaction between two magnetic members 140, 142 (FIG. 4) that move relative to each other as the top plate is depressed/compressed from its extended condition toward its fully compressed or retracted condition, thereby further compressing the springs. The exemplary magnetic members are a pair of magnets. A first magnet 140 is mounted to the underside 116 of the top plate 106 and a second magnet 142 directly below is mounted to the upper surface 120 of the bottom plate 122 with a separation $S_1$ between them. The exemplary configuration has the magnets vertically polarized. The polarization may be parallel (not shown) or anti-parallel (e.g., south pole facing south pole as shown in FIG. 4 or north pole facing north pole). The parallelity again is merely an ideal goal. Manufacturing tolerances and other variations will cause departures from true alignment of polarity. However, whatever the relative alignment, a calibration may be taken and recorded in order to ensure measurement accuracy.

Exemplary magnetic members 140, 142 may both be permanent magnets. The exemplary form of the permanent magnets are vertical axis cylinders each with an upper surface, a lower surface, and a circular cylindrical periphery. Thus, a gap (of separation distance $S_1$) is formed between the lower surface or underside 150 of the upper magnet 140 and the upper surface 152 or top of the lower magnet 142. The relative proximity of the magnets affects the properties of the magnetic field between and around the magnets. Thus, measuring properties of the magnetic field may serve to measure the spacing between the magnets which, in turn, serves to measure the weight of the tank (including contents). To monitor/measure the magnetic field, one or more magnetic field sensors 160 are positioned between or around the magnets. Exemplary magnetic field sensors are Hall effect sensors. The exemplary configuration places a single three-dimensional (3D) sensor aside the magnets. An exemplary 3D sensor is an IC with multiple plates on a single chip to enable 3D field sensing. The exemplary IC has six pins of which a single pin provides digital output.

Figure 7:
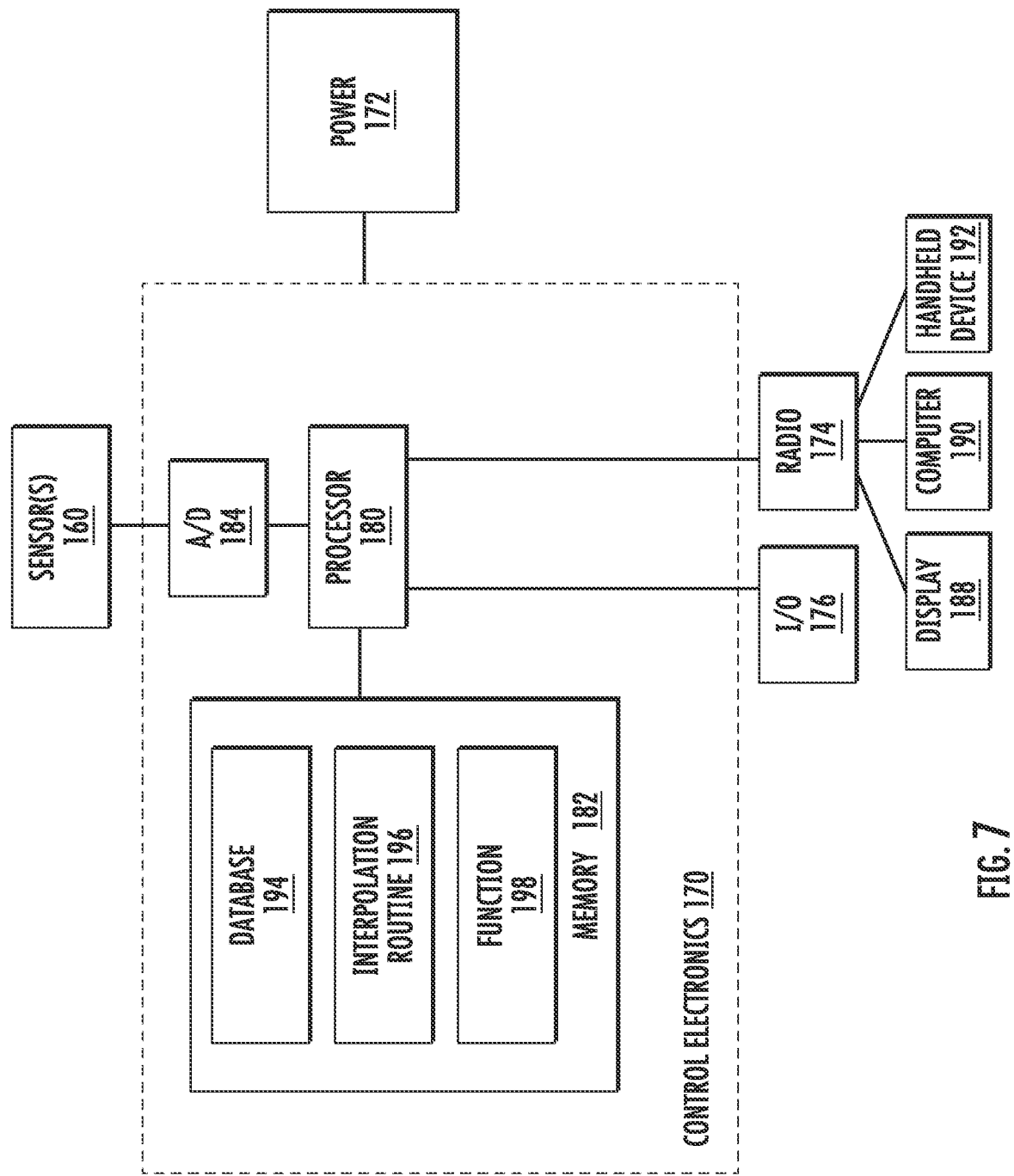
FIG. 7 is an electronics block diagram/schematic for the scale.

The 3D sensor is coupled to control electronics 170 (FIGS. 3, 7) that can convert the output of the 3D sensor to some parameter either directly representative of the weight or indirectly representative of the weight. The control electronics 170 may be coupled to a power source such as a battery 172 and/or external power. The controller may receive user inputs from an input device (e.g., switches, keyboard, or the like). Input devices may be mounted on the scale 100 (e.g., touchscreen 176 (FIG. 1)) or may be remote. Remote devices may include devices connected via a radio 174 (FIG. 3) using Bluetooth, WiFi, ZigBee, or other suitable protocol.

The control electronics 170 (FIG. 7) may include one or more: processors 180; memory/storage 182 (e.g., for storing program information for execution by the processor to perform the operational methods and for storing data used or generated by the program(s)); and hardware interface devices (e.g., ports) for interfacing with input/output devices (e.g., touchscreen 176) and sensor 160 and any other components such as alert lights or sound alarms. Signal conditioning such as an analog-to-digital converter 184 may be present if required. Sensors having digital outputs (e.g., I2C bus 3D sensors) may omit such conversion.

The control electronics 170 may obtain power from external (e.g., wall power or external battery) or internal (e.g., battery) power supply 172, and may output information to external or internal radio transmitter 174 that may be further coupled to an external or remote display 188, computer 190, or/and hand held device 192 such as a mobile phone or tablet.

In one example when a 3D sensor 160 is used, the sensor signal voltages are translated by the A/D converter 184 to digital values appropriate for reading by the processor 180. The sensor signals are then compared with a look-up table (or other database) 194 stored in memory. The look-up table may have a format (sensor x output, sensor y output, sensor z output, mass). A multi-variate interpolation program/routine 196 may be used to approximate the suppressant (or other fluid) mass based on sensor values. The determined mass is output to an output device, such as internal display 176 and/or relayed through a radio transmitter 174 to an external/remote display 188, computer 190 and/or hand held device 192.

In another example, signals from the same 3D sensor 160 may be analyzed by the processor 180 using stored functions 198 (FIG. 7) to estimate the degree of off-center load distribution and estimate the mass. In one particular exemplary embodiment, ratios between the sensor outputs for measurements in x-, y-, and z-directions may be used to estimate degree of the off-center load placement. The memory may store function 198 as a functional relationship incorporating these ratios into an equation for mass to then output the mass. Although such a function 198 may replace the look-up table (or other database) 194 and interpolation program 196, the coefficients for that function 198 may have originally be determined using the same calibration data that would have populated the table.

In one example, the control electronics 170 may output a parameter directly indicative of the weight of suppressant above the empty condition (e.g., the output is such mass in kilograms) or otherwise the weight of suppressant in the tank. The control electronics 170 may be programmed with formulas to convert the sensor 160 outputs to the weights or a look-up table 194 may intervene. For example, the controller 170 may be programmed with a look-up table 194 created via placing known masses of tank at various locations on and off-center. In the FIG. 4 exemplary embodiment, increasing the weight placed on top plate 106 would result in bringing the two magnetic members 140 and 142 into closer proximity to each other. As a result the distance or separation $S_1$ between faces 150 and 152 would be reduced. This in turn, would result in greater magnetic field at the sensor 160, which would yield higher sensor output voltage. The functional relationship between the gap formed by faces 150 and 152 and the voltage reported by the sensor 160 serves as the basis for weight determination. This relationship may be linear or non-linear. The particular placement of the sensor 160, its sensitivity characteristics, magnetic field strength of the magnetic members 140 and 142 and the mechanical characteristics of the springs 112 all influence the particular relationship between the weight and the sensor output. By appropriately choosing these parameters, it is possible to achieve simple functional relationship (e.g., linear) between the suppressant weight change in the tank and the sensor 160 output. This simple relationship is preferred as it reduces computational demands of the control electronics 170. Thus, the use of a functional relationship may be an alternative to the use of a look-up table 194. The look-up table may, for example, be used when there is not a linear relationship. Look-up tables may be used when a 3D Hall sensor is used (e.g., one axis may present a linear relationship, while the other axes may exhibit non-linear relationships).

To construct the look-up table 194, calibration might be performed, for example, measurements (e.g., sensor 160 outputs) may be taken at zero weight/mass and then with several increments of tank mass up to the expected maximum mass. For each mass, measurements may be taken with the tank 22 located at several different positions circumferentially and radially away from the center on the scale 100. In a highly symmetric system (e.g., wherein the sensor(s) are symmetric and the springs are symmetric), it might be possible to use a look-up table 194 calculated by tests only in one sector of the footprint as measured at each spring 112. The control electronics 170 would then be configured to determine which of several equivalent sectors the actual mass was centered in. When a tank 22 of unknown mass is atop the scale 100, the control electronics 170 may perform a conventional interpolation of the three variables (mass and two position variables (X-Y coordinates or polar coordinates)) and sensor 160 outputs to determine mass and position. This may also allow the control electronics 170 to determine a degree of off-center position and thus provide an alert of an off-center condition beyond a predetermined threshold. In addition to simple off-center conditions, yet further aberrant conditions might be detected if outside the domain of the look-up table 194 or outside of some domain of pure calculation. This may be used to determine a situation where, for example, one tank is leaning against another tank or a wall.

Thus, a single 3D sensor 160 may be used to determine the off-center load condition. In relation to sensor 160 illustrated in FIG. 4, readings along the three sensor axes will remain in certain ratio-metric relationship when the two faces 150 and 152 of the magnetic members 140 and 142, respectively, remain parallel. This would be the normal condition for centered weight load. With the weight load off-center, these signal ratios between different sensor axes will change and may be used to correct for the condition or to issue a warning that the measured weight may be inaccurate due to the off-center condition.

Numerous further variations exist regarding magnetic field sensor, spring, and magnet configurations. One area of variations involves situations other than two axially-opposed magnets. Thus, for example, one of the magnetic members may be a permanent magnet and the other may be other than a permanent magnet (e.g., a ferromagnetic steel element such as the top plate or base itself or an attachment thereto).

Variations may involve omitting the top plate 106 and supporting the tank base/bottom 111/110 directly on the springs 112. If a top magnet 140 is present, it may be secured to the underside of the tank 22 via adhesive or the like. For example, many tanks have a base formed by a metal ring that holds the lower extremity of the lower domed end of the tank spaced above any support surface. This space may accommodate the added magnet.

Further variations involve placing the one or more magnets concentrically within associated springs. In a modification of the illustrated example, this could involve adding a center spring around the magnets 140, 142.

Further alternatives involve similar concentric position of the magnets to the peripheral springs (e.g., having four pairs of magnets within the illustrated four springs 112 and no center magnet). In such situations, there could be a central 3D magnetic field sensor or there could be individual sensors associated with the individual magnet pairs.

One particular area of variation involves use of 1D magnetic field sensors. 1D sensors typically offer higher resolution than 3D sensors. One example of a system using only 1D sensors is to evenly space three 1D sensors around the magnets. For simplicity of calculation, such a system might favor use of three or six evenly circumferentially-spaced springs.

One example of a combination of sensor types involves combination of 1D and 3D magnetic field sensors. 1D and 3D sensors may be placed in proximity to each other and the magnets. In this case, 1D sensor provides more accurate reading of the gap between the magnets or other indication of the amount of compression. Meanwhile, the 3D sensor provides indication of off-center load placement. The off-center amount can be used to correct the 1D sensor output to produce a weight measurement and/or trigger an error message instructing a technician to re-center the tank 22.

Even further examples involve 2D magnetic field sensors (either a combination of 2D sensors or a combination of one or more 2D sensors and one or more 1D or 3D sensors.

A yet further area of variation involves one or magnets that do not move relative to each other or relative to an adjacent ferromagnetic steel but move relative only to one or more sensors. For example, in a scale 300 (FIG. 5), one or more magnets 320 may be mounted to the tank underside (e.g., bottom of the domed lower end within tank base 111) or top plate underside 116 and one or more sensors 322 may be mounted to the scale base 122 below the magnet(s) (directly below or aside) 320. The exemplary magnet 320 is shown with a vertically-oriented polarity and exemplary sensor 322 (e.g., 3D sensor discussed above or multiple 1D sensors circumferentially arrayed) positioned aside the magnet. Movement of the magnet relative to the sensor produces changes in the magnetic field measured by the sensor.

Figure 6:
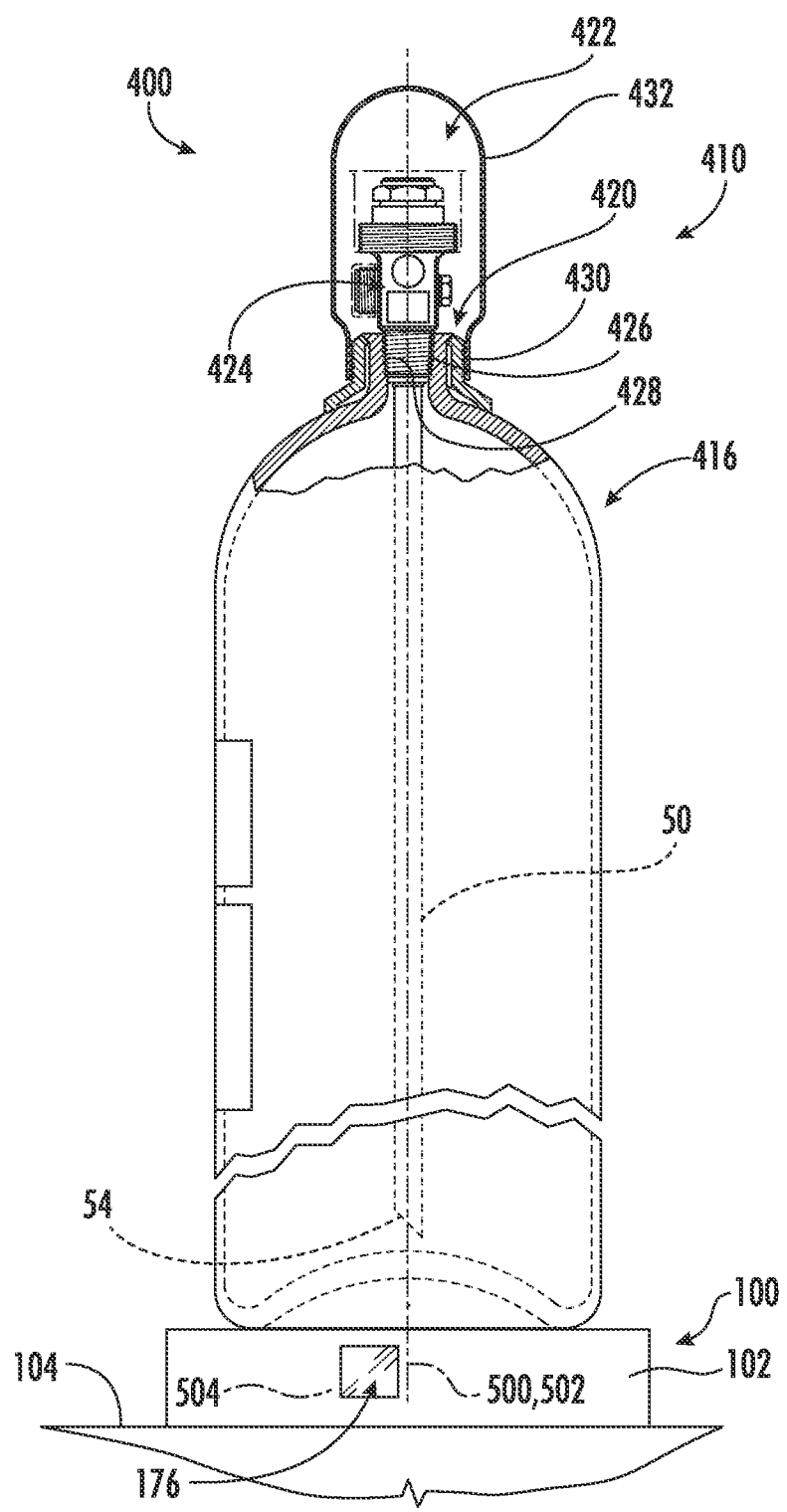
FIG. 6 is a partially cutaway view of a second fire suppressant storage device atop a tank scale.

FIG. 6 shows fire suppressant storage device 400 having an inert agent (e.g., $CO_2$) tank 410 atop a scale 100. The exemplary tank 410 comprises a seamless metal cylinder 416 having a single central fitting 420 defining a port. The lower end of the cylinder 416 is concave to form an integral base of the tank 410. The discharge valve assembly 422 includes a discharge valve 424 and has a body that is externally threaded 426 to engage an internal thread 428 of the fitting 422. The fitting however also has an external thread 430 normally used for a protective cap 432.

The use of "first", "second", and the like in the description and following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing basic system, details of such configuration or its associated use may influence details of particular implementations. Accordingly, other embodiments are within the scope of the following claims.

What is claimed is:

1. A fire suppression system comprising:
   a tank (22; 410) having a first port (40; 420) and an interior (32);
   at least one of a fire suppressant and a fire suppression propellant in the interior;

a discharge assembly (46; 422) mounted to the first port and comprising a discharge valve (48; 424);
a base (102);
one or more springs (112) positioned to support the tank atop the base along a range of motion between a first condition and a second condition, the first condition relaxed relative to the second condition and the second condition compressed relative to the first condition;
a first magnetic member (142) mounted to the base;
a second magnetic member (140) mounted relative to the tank so that a spacing between the first magnetic member and the second magnetic member decreases as the tank moves when the one or more springs go from the first condition to the second condition, at least one of the first magnetic member and the second magnetic member being a permanent magnet; and
a magnetic field sensor (160) positioned to detect changes in a magnetic field associated with changes in said spacing.

2. The system of claim 1 wherein:
the first magnetic member and the second magnetic member are permanent magnets.

3. The system of claim 1 wherein:
the first magnetic member and the second magnetic member have opposed polarity.

4. The system of claim 1 wherein:
the magnetic field sensor is a 3D magnetic field sensor.

5. The system of claim 4 wherein:
the 3D magnetic field sensor is an IC sensor.

6. The system of claim 1 wherein:
the magnetic field sensor is a Hall effect sensor.

7. The system of claim 1 wherein:
the first magnetic member and the second magnetic member are centrally located.

8. The system of claim 1 wherein:
the one or more springs is a plurality of coil springs.

9. The system of claim 1 further comprising:
control electronics (170) having memory (182) storing at least one of a database (194) and a function (198) relating sensor output to mass.

10. The system of claim 1 further comprising:
a top plate supporting the tank (22; 410).

11. The system of claim 1 wherein the discharge assembly further comprises:
a discharge tube (50) extending having a lower end (54) below a surface of said at least one of a fire suppressant and a fire suppression propellant.

12. The system of claim 1 further comprising:
a liquid level sensing or measuring assembly (82) is mounted to a second port (70) of the tank.

13. A method for measuring a fire suppressant or fire suppression propellant quantity, the method comprising:
with a tank (22; 410) of the fire suppressant or fire suppression propellant supported by one or more springs (112), the fire suppressant comprising one or more halocarbons, hydrofluorocarbons, or fluoroketones or the fire suppression propellant comprising nitrogen ($N_2$), argon (Ar), or carbon dioxide ($CO_2$), the one or more springs positioned to support the tank along a range of motion between a first condition and a second condition, the first condition relaxed relative to the second condition and the second condition compressed relative to the first condition, measuring a magnetic field that varies with position along the range of motion; and
converting the measurement of the magnetic field into a measurement of said quantity.

14. The method of claim 13 wherein:
the converting is performed via control electronics (170).

15. The method of claim 14 wherein:
the converting comprises using a look-up table (194) with data for a combination of tank mass and tank position on a scale.

16. The method of claim 14 further comprising:
initializing the control electronics.

17. The method of claim 16 wherein:
the initializing the control electronics comprises populating a look-up table with data for a combination of tank mass and tank position on a scale.

18. The method of claim 14 wherein:
a 3D magnetic field sensor provides a digital output to the control electronics.

19. The method of claim 13 wherein:
the measuring the magnetic field is via a 3D magnetic field sensor.

20. The method of claim 13 wherein:
the tank (22; 410) has a first port (40; 420) and an interior (32);
at least one of the fire suppressant and the fire suppression propellant is in the interior;
a discharge assembly (46; 422) is mounted to the first port and comprises a discharge valve (48; 424);
a base (102);
the one or more springs (112) are positioned to support the tank atop a base along the range of motion between the first condition and the second condition;
a first magnetic member (142) is mounted to the base;
a second magnetic member (140) is mounted relative to the tank so that a spacing between the first magnetic member and the second magnetic member decreases as the tank moves when the one or more springs go from the first condition to the second condition, at least one of the first magnetic member and the second magnetic member being a permanent magnet; and
a magnetic field sensor (160) is positioned to detect changes in a magnetic field associated with changes in said spacing for said measuring.

\* \* \* \* \*